United States Patent [19]
Constant et al.

[11] 4,032,219
[45] June 28, 1977

[54] LIQUID CRYSTAL DISPLAY DEVICES

[75] Inventors: Jennifer Constant; Ian Alexander Shanks; Edward Peter Raynes, all of Worcester, England

[73] Assignee: The Secretary of State for Defence in Her Britannic Majesty's Government of the United Kingdom of Great Britian and Northern Ireland, London, England

[22] Filed: Oct. 17, 1975

[21] Appl. No.: 623,506

[30] Foreign Application Priority Data
Oct. 21, 1974 United Kingdom .......... 45495/74

[52] U.S. Cl. .................. 350/160 LC; 252/299
[51] Int. Cl.² .................. G02F 1/16; C09K 3/34
[58] Field of Search .......... 350/160 LC; 252/299, 252/408 LC, 300

[56] References Cited
UNITED STATES PATENTS 3,833,287  9/1974  Taylor et al. ............. 350/160 LC
3,864,022  2/1975  Moriyama et al. ........ 350/160 LC Primary Examiner—John K. Corbin
Assistant Examiner—R. Hille
Attorney, Agent, or Firm—Stevens, Davis, Miller & Mosher

[57] ABSTRACT

A liquid crystal guest-host display device includes a dye dissolved in the liquid crystal material. The invention is characterized in that the dye comprises three colored dye compounds mixed together to provide gray in the absence of an applied electric field. The compounds may be Sudan Black, Sudan Red and β-carotene. The liquid crystal material preferably includes at least one 4'-alkyl- or -alkoxy-4'-cyanobiphenyl compound.

9 Claims, 4 Drawing Figures

LIQUID CRYSTAL DISPLAY DEVICES

The present invention relates to liquid crystal display devices.

In the prior art several liquid crystal display devices known as guest-host devices, are known in which a dye guest is dissolved in a layer of liquid crystal host material. In such devices the dye molecules are aligned with their neighbouring liquid crystal molecules. When an electric field is applied across the layer the liquid crystal molecules and the dye molecules are re-oriented together. The absorption of light by the dye molecules in the state when no electric field is applied, the "off state," is different from that in the state when an electric field is applied, the "on state." Consequently the addition of the dye improves the contrast of the display device between the on and off states. However, in most of the known devices the improvement produced is not as great as might be expected. One known reason for this is that if the dye molecules are roughly of the same length as the liquid crystal molecules, as they are in known devices, the dye molecules undergo random fluctuations in orientation together with the random thermal fluctuations of the liquid crystal molecules. This problem may be reduced to some extend in a known way by using dye molecules which are significantly longer than the liquid crystal molecules.

Until the discovery of guest-host devices liquid crystal devices provided only black and white (dark gray and light gray) displays. On the other hand other devices in the display field, eg electroluminescent devices provided colored displays. Thus, when guest-host devices were discovered the color provided by the presence of the dye was generally regarded as adding an improvement to the visual appearance of liquid crystal displays. However, although the coloring appears to make the display visually more attractive it has now been discovered that the coloring also has a disadvantage as follows.

One state eg the on state gives a lightened version of the color, eg light blue, and the other eg off state gives a darkened version, eg dark blue, depending on the liquid crystal effect used. However since both versions have the same color it is difficult for the human eye to detect subjectively a strong contrast between them, if located side-by-side, probably since attention is diverted to the color similarity and away from the intensity contrast of the light emerging from them.

According to the present invention a liquid crystal display device includes a layer of liquid crystal material having dissolved therein a mixture of colored dyes such that in the absence of an applied electric field the layer appears gray to the human eye if observed directly, and means for applying across the layer an electric field capable of changing the optical transmissivity of at least part of the layer.

The term 'gray' is intended to include a gray which might be tinted slightly.

Although the provision of a gray dye mixture results in a loss of visual attractiveness owing to loss of color it nevertheless provides an improved contrast.

The display device according to the invention is capable of providing dark gray characters or symbols on a light gray background or vice versa depending on the liquid crystal effect is uses. A reasonable contrast can be observed between the characters or symbols and the background since the attention of the eye of an observer is not subjectively diverted to the color of the light from the display. In other words, the eye subjectively sees light gray areas as white and dark gray areas as black if observed side-by-side. Additionally full use can be made of the entire visible spectrum giving the maximum intensity change and hence contrast between the absorbing and non-absorbing states of the dye mixture.

The dye mixture may for example be a mixture of Sudan Black Color Index No 26150 (which is blue), Sudan Red (IV) Color Index No 26105 (which is red) and β-carotene (which is yellow).

The liquid crystal material may include one or more 4'-alkyl - or -alkoxy-4-cyanobiphenyls.

Preferably the display device is a cholesteric to nematic phase-change effect device, such as described in U.S. patent application Ser. No. 318,794 filed Dec. 27, 1972 now abandoned, becasue such a device provides the greatest contrast between the on and off states with dye added. This device may simply be constructed by containing a layer of cholesteric liquid crystal material between two optically transparent substrates such as glass slides having transparent conduction electrodes on their inner surfaces. With the mixture of dyes added the liquid crystal layer appears dark grey in the off state and light grey or clear in the on state.

Alternatively the device may be a 'twisted nematic' (Schadt and Helfrich) effect device; a device similar to a twisted nematic effect device but containing optically active material (eg nematic material diluted with a small concentration of cholesteric material) instead of pure nematic material, as described in U.S. patent application Ser. No. 551,551 filed Feb. 21, 1975 and Ser. No. 552,346 filed Feb. 24, 1975 and copending United Kingdom patent application 19131/74; or a Freedericksz effect device. In each of these cases the mixture of dyes is added to the liquid crystal material to enhance the optical contrast between the on and off states. The device acts as its own polariser and requires only one additional polarising medium as its analyser.

The device may also be a 'dynamic scattering' device or a 'parallel rubbed' device.

Each of the above devices may additionally incorporate a reflector located directly behind the rear substrate, eg glass slide, used to enclose the liquid crystal layer. The reflector ensures that the observed background to the displayed information is uniform.

Embodiments of the present invention will now be described by way of example with reference to the accompanying drawings in which.

Figure 1:
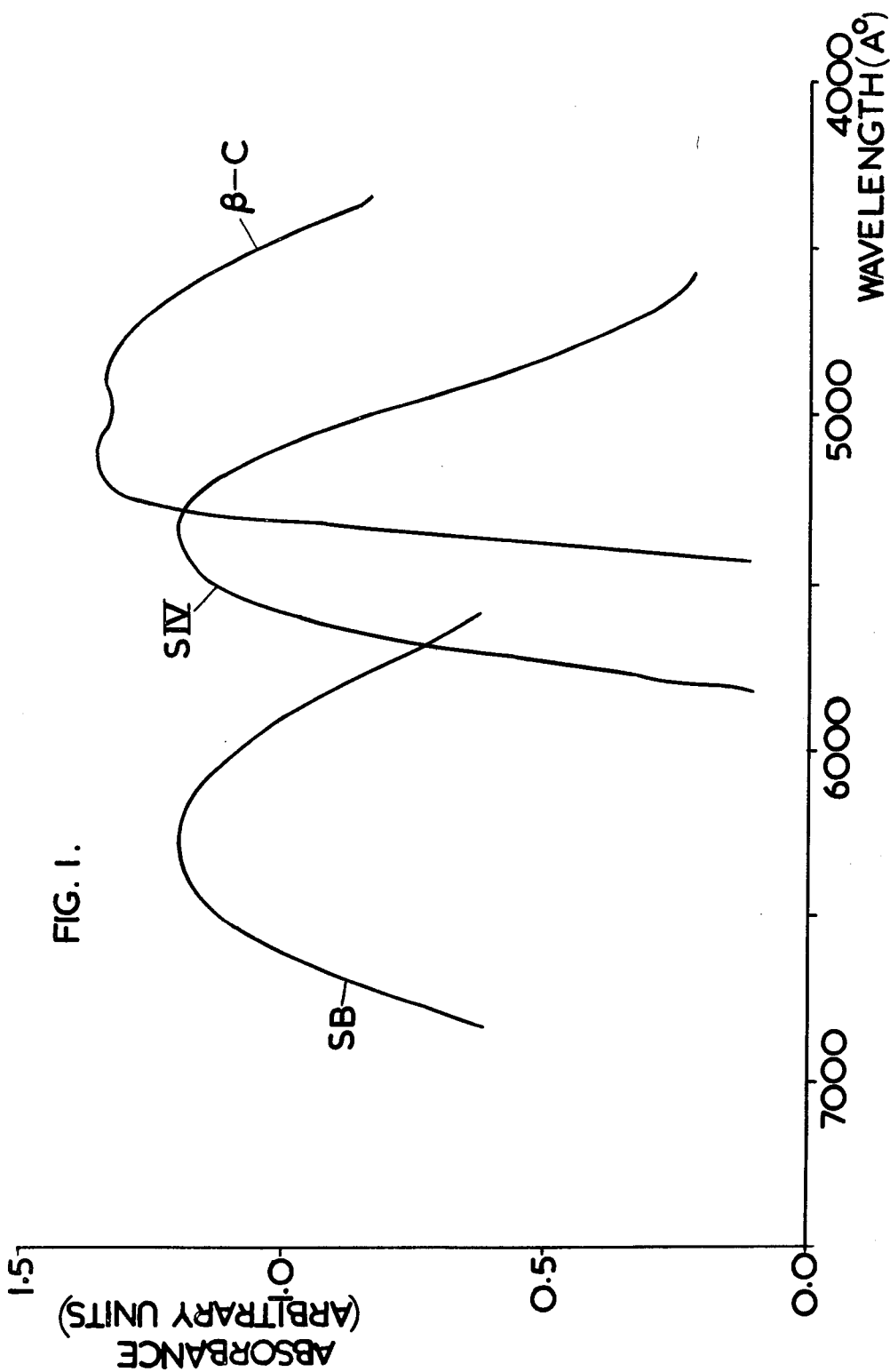
FIG. 1 is a graph of the absorbance of three known dyes plotted as a function of wavelength.

The absorbances, ie the logarithms of the percentage of incident white light absorbed, have been measured for three separate dyes as a function of wavelength and are shown plotted in FIG. 1. The dyes consisted of Sudan Black whose absorbance curve is denoted in FIG. 1 by the symbol SB, Sudan IV denoted by the symbol SIV, and β-carotene denoted by the symbol β-C. The dyes were of equal concentrations by weight, namely 0.75% by weight of each dye dissolved in 99.25% liquid crystal material, the liuqid crystal material being transparent and in the form of a layer 12 microns thick. Sudan Black is a deep blue dye; consequently the curve SB peaks in the red region of the spectrum at a wavelength of about 6300A. Sudan VI is a red dye; consequently the curve SIV peaks in the green region of the spectrum at about 5200A. The dye β-carotene is yellow; consequently the curve β-C peaks in the blue-green region of the spectrum at about 5000A.

If the three dyes whose absorbances are shown in FIG. 1 are mixed together in equal proportions by weight the overall absorbance will be the envelope of the three curves shown in FIG. 1. However the curves may be shifted along the absorbance axis by varying the concentration of each dye in a given layer of liquid crystal material. Thus it is possible to vary the envelope of the three curves by varying the individual dye concentrations in a mixture of the three dyes in liquid crystal material. If this is done to yield the flattest possible envelope throughout the visible spectrum the mixture still appears coloured to the human eye. This is because the eye is more sensitive to wavelengths of about 6000A than to other wavelengths; thus in order to obtain a mixture of the dyes which appears dark grey it is necessary for the envelope of the absorbance of the mixture to peak slightly near to 6000A.

Figure 2:
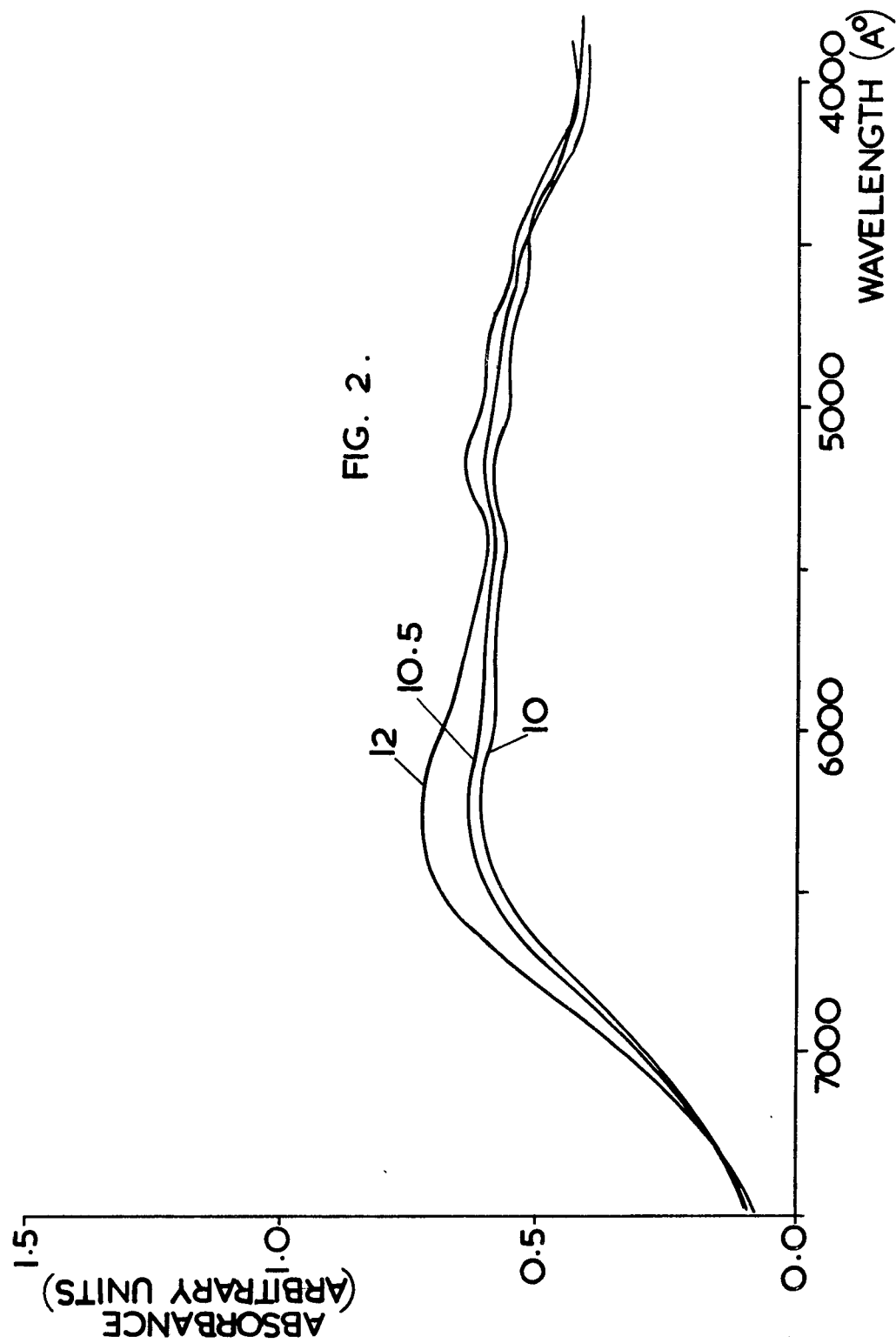
FIG. 2 is a graph of the absorbance of a mixture of the dyes whose separate absorbances are shown in FIG. 1, plotted as a function of wavelength.

FIG. 2 shows a family of three absorbance curves 10, 10.5, and 12, of such a grey mixture formed in liquid crystal liquid crystal layers of 10, 10.5 and 12 microns respectively. The curves were obtained from a mixture of 5 parts by weight of Sudan Black, one part by weight of Sudan IV and two parts by weight of β-carotene. This dye mixture formed 1.5% by weight of a mixture with the liquid crystal material which consisted of the following mixture:

| Mixture X | | |
|---|---|---|
| | $C_5H_{11}O$—⬡—⬡—CN | 45% by weight |
| | $C_7H_{15}O$—⬡—⬡—CN | 41% by weight |
| | $C_5H_{11}$—⬡—⬡—⬡—CN | 14% by weight |
| Cholesteryl nonanoate | | 5% by weight in a mixture with Mixture X |

Although the curves 10 10.5 and 12 shown in FIG. 2 do not peak exactly at the sensitivity peak of the human eye nevertheless they peak sufficiently near enough and by an appropriate amount to give the mixture a grey appearance.

Figure 3:
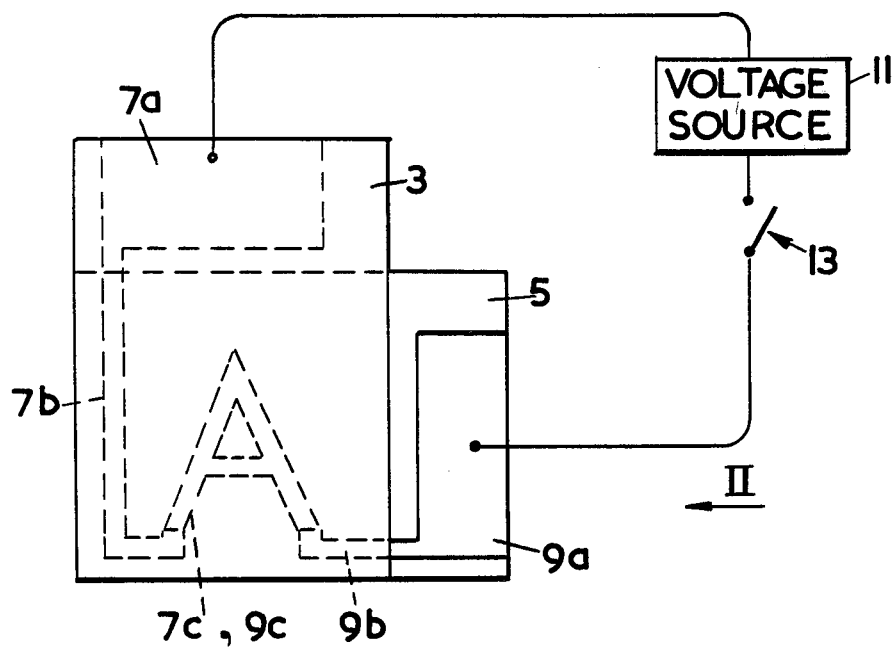
FIG. 3 is a diagram, partly in the form of a front elevational view and partly in the form of a schematic circuit diagram, illustrating a liquid crystal display device embodying the present invention.
Figure 4:
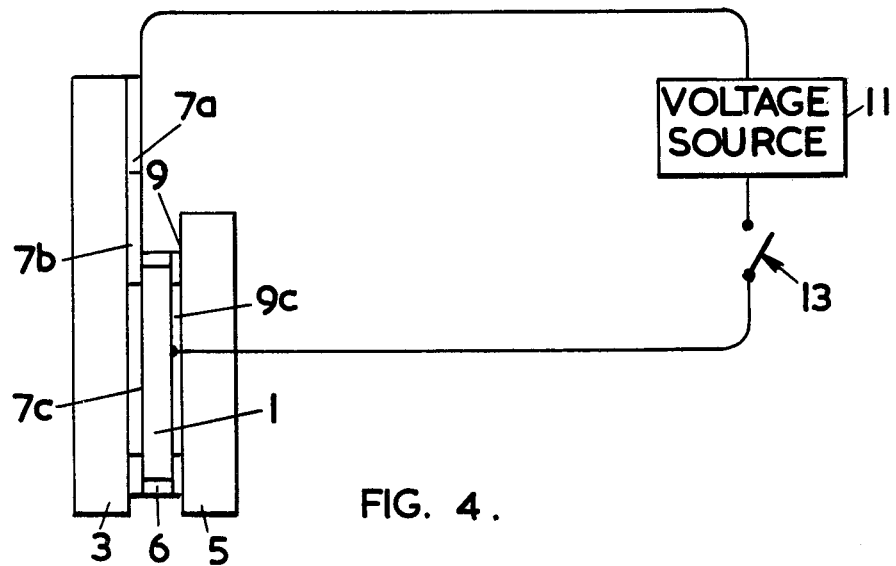
FIG. 4 is a diagram, partly in the form of a part sectional side elevation in the direction II and partly in the form of a schematic circuit diagram, of the device illustrated in FIG. 3.

A solution of the above dye mixture (1.5% by weight) in the above liquid crystal mixture (98.5% by weight) may be prepared as follows: The individual dyes and liquid crystal compounds are all added together in the appropriate weights in a small beaker. The beaker is heated to a temperature at which the liquid crystal mixture is an isotropic liquid, ie about 100° C. The beaker is then maintained at that temperature for about 20 minutes. The contents are frequently stirred during this period. The beaker is then allowed to cool. The liquid crystal mixture in the solution produced after cooling is cholesteric and the solution may thus be used in a phase change effect device embodying the present invention; such a device will now be described with reference to FIGS. 3 and 4.

A layer 1 of the solution prepared as described above is sandwiched between two parallel rectangular glass slides 3 and 5 having their respective longer edges perpendicular to one another and having on their respective inner surfaces optically transparent electrically conducting electrodes 7 and 9, made for example of tin oxide deposited in a known way such as by sputtering and photo-etching. The electrode 7 is in the form of a patch 7a on an area of the slide 3 which does not face the slide 5, a strip 7b leading from the patch 7a and a region 7c attached to the strip 7b and in the form of a letter A. The electrode 9 is in the form of a patch 9a on an area of the slide 5 which does not face the slide 3, a strip 9b leading from the patch 9a and a region 9c attached to the strip 9b and which is in the form of the letter A. The region 7c and the region 9c are arranged to be identical and to face one another. The slides 3 and 5 are held apart by a ring-shaped spacer 6 which defines the lateral extremities of the layer 1.

A voltage source 11 and a switch 13 in series with it are connected between the patch 7a and the patch 9a. The source 11 provides a voltage, which may be either direct or alternating, sufficient to cause the phase-change effect to occur to the liquid crystal mixture in the layer 1. For a layer thickness of 6 microns a rms voltage of about 7.5 volts at 1 kHz has been found suitable.

When the switch 13 is open the applied voltage is zero and the liquid crystal mixture in the layer 1 is in the cholesteric phase. This means that the liquid crystal molecules are arranged in randomly orientated helices and the dye molecules are arranged in a similar form. The layer 1 is thus absorbing to all polarisations of light incident on it and thus highly absorbing overall. The absorbance of the dye mixture is as shown in FIG. 2 and consequently the layer 1 appears dark grey.

If the switch 13 is closed the electric field produced by the voltage source 11 causes the liquid crystal and dye molecules between the regions 7c and 9c to be re-orientated to lie with their axes perpendicular to the slides 3 and 5, ie along the electric field. In this condition the part of the layer 1 between the regions 7c and 9c appears clear or light grey because the arrangement of liquid crystal and dye molecules is much more ordered and hence not absorbing to all forms of polarisation incident on it, so that overall the absorption by the dye molecules is significantly reduced. The parts of the layer 1 are not between the regions 7c and 9c remain dark grey.

Thus by opening and closing the switch 13 as required the letter A may be displayed or not displayed accordingly. Other letters and symbols, or groups of them, may be displated in a similar way.

Preferably the device includes a reflector (not shown) such as a cardboard or plastic screen sprayed with aluminium paint, located behind the slide 3. If the device is then observed from in front of the slide 5 the reflector provides a more uniform background to the letter A.

In an alternative device embodying the invention the area not between the electrodes may define the symbol or symbols and the area between the electrodes may define the background, whereby the background may be switched between a dark grey state which merges with dark grey symbols, and a clear or light grey state which contrasts with the symbols.

We claim:

1. A liquid crystal display device comprising a layer of liquid crystal material, a dye dissolved in said liquid crystal material, and means for applying across said layer an electric field capable of changing the optical transmissivity of a least a part of said layer, wherein the improvement comprises said dye being formed of a mixture of at least three colored dye compounds one of which is blue, one of which is red and one of which has a color between blue and red, said mixture providing an overall gray color in the absence of an applied electric field.

2. A device as claimed in claim 1 wherein one of said dye compounds in Sudan Black.

3. A device as claimed in claim 1 and wherein one of said dye compounds is $\beta$-carotene.

4. A device as claimed in claim 1 and wherein one of said dye compounds is Sudan Red.

5. A device as claimed in claim 1 and wherein said mixture includes Sudan Black, Sudan Red and $\beta$-carotene in an approximate ratio of 5 parts by weight: 1 part by weight: 2 parts by weight.

6. A device as claimed in claim 1 and wherein said liquid crystal material includes at least one compound which is a 4'-alkyl-4-cyanobiphenyl.

7. A device as claimed in claim 1 and wherein said liquid crystal material includes at least one compound which is a 4'-alkoxy-4-cyanobiphenyl.

8. A liquid crystal device comprising a layer of liquid crystal material having a mixture of at least three colored dye compounds dissolved therein which combine to impart to the liquid crystal layer contrasting gray colors in the off and on state of an electric field, one of the colors being red, another of the colors being blue, and a third color being intermediate red and blue, and means for applying an electric field across the said layer to change the optical transmissivity of at least a part of the said layer.

9. A method of improving the contrast of liquid crystal material between the off and on states of an applied electric field which comprises dissolving in the liquid crystal material a mixture of colored dyes including red, blue, and a color intermediate red and blue which in the absence of an electric field imparts an overall light gray color to the liquid crystal material.

* * * * *